United States Patent Office 3,562,299
Patented Feb. 9, 1971

3,562,299
PROCESS FOR PREPARING ANTHRAQUINONE DYESTUFFS
Edwin Dennis Harvey, Manchester, England, assignor to Imperial Chemical Industries Limited, London, England, a corporation of Great Britain
No Drawing. Filed June 30, 1967, Ser. No. 650,261
Claims priority, application Great Britain, July 11, 1966, 30,972/66
Int. Cl. C09b 1/06, 1/22, 1/50
U.S. Cl. 260—371
3 Claims

ABSTRACT OF THE DISCLOSURE

An improved process for the manufacture of anthraquinone compounds containing hydroxymethyl groups which comprises reacting the corresponding compounds containing sulphonic acid groups with formaldehyde and a reducing agent in an alkaline medium.

This invention relates to a manufacturing process, and more particularly it relates to a process for manufacturing anthraquinone compounds.

According to the invention there is provided a process for the manufacture of anthraquinone compounds containing one or two hydroxymethyl groups each of which is in ortho- or para-position to a hydroxy, amino or alkylamino group which comprises treating an anthraquinone mono- or di-sulphonic acid containing a hydroxy, amino or alkylamino group in ortho or para position to each sulphonic acid group with formaldehyde and a reducing agent in an alkaline medium.

The process of the invention can be conveniently carried out by adding the formaldehyde and the reducing agent to an aqueous alkaline solution of the anthraquinone mono- or di-sulphonic acid, and stirring the resulting mixture, preferably under an inert atmosphere, and preferably at a temperature between 0° and 100° C. The resulting anthraquinone compound containing one or two hydroxymethyl groups can then be isolated by conventional methods.

As examples of reducing agents which can be used in the process of the invention there may be mentioned zinc dust and salts of hydrosulphurous acid such as sodium hydrosulphite. If desired the formaldehyde can be used in the form of a complex with a reducing agent, for example a formaldehyde sulphoxylate complex.

In addition to the hydroxy, amino or alkylamino group which is attached to the anthraquinone nucleus in ortho- or para-position to each sulphonic acid group the anthraquinone mono- or di-sulphonic acid groups used in the process of the invention can also contain other substituents directly attached to one or more carbon atoms of the anthraquinone nucleus, and in particular substituents which impart colour to anthraquinone compounds and confer on them the properties of dyestuffs. As examples of substituents which may be additionally present in the said anthraquinone mono- or di-sulphonic acids there may be mentioned chlorine or bromine atoms or cyano, lower alkyl such as methyl, lower alkoxy such as methoxy, hydroxy, amino, lower alkylamino such as methylamino, anilino, substituted anilino such as methylanilino, methoxy-anilino, chloroanilino, 2:4:6-trimethylanilino, β-hydroxy-ethoxyanilino, carboxyanilino and sulphoanilino, hydroxyphenyl, lower alkoxy phenyl such as methoxyphenyl, mercapto, lower alkyl mercapto such as methylmercapto, phenylmercapto, phenylureido, phenylthioureido, benzoylamino, lower alkyl carbonamido such as acetylamino, or sulphonic acid groups.

When the said anthraquinone mono- or di-sulphonic acids contain an additional sulphonic acid group or groups which is not in ortho- or para-position to an amino, hydroxy or alkylamino group, then the resulting mono- or di-hydroxymethyl anthraquinone also contains one or more sulphonic acid groups as these additional sulphonic acid group or groups are not replaced by hydroxymethyl groups.

Throughout this specification the terms "lower alkyl" and "lower alkoxy" are used to denote alkyl and alkoxy radicals respectively containing from 1 to 4 carbon atoms, such as methyl, ethyl, methoxy, ethoxy, n-propoxy and n-butoxy radicals.

A preferred class of the said anthraquinone mono- or di-sulphonic acids for use in the process of the invention comprises 1-aminoanthraquinone-2-sulphonic acid or 1-hydroxyanthraquinone-2-sulphonic acid with optionally contain further substituents in the anthraquinone nucleus, and which, above all, contain a further substituent in the 4-position of the anthraquinone nucleus.

As specific examples of the said anthraquinone mono- or di-sulphonic acids which can be used in the process of the invention there may be mentioned 1-aminoanthraquinone-2-sulphonic acid,
1-hydroxyanthraquinone-2-sulphonic acid,
1-(amino or hydroxy)-4-(chloro- or bromo-)anthraquinone-2-sulphonic acid,
1:4-di(hydroxy or amino)anthraquinone-2-sulphonic acid,
1-amino-4-hydroxyanthraquinone-2-sulphonic acid,
1-amino-4-anilinoanthraquinone-2-sulphonic acid,
1-amino-4-[p-(β-hydroxyethoxy)anilino]-anthraquinone-2-sulphonic acid,
1:8-dihydroxyanthraquinone-2:7-disulphonic acid,
1:5-dihydroxy-4:8-di(amino or methylamino)-2-(4'-hydroxyphenyl)anthraquinone-6-sulphonic acid,
1:5-dihydroxy-4:8-di(amino or methylamino)anthraquinone-2:6-disulphonic acid and
1-amino-4-acetylaminoanthraquinone-2-sulphonic acid.

The process of the invention results in the formation of anthraquinone compounds containing hydroxymethyl groups in much higher yield than can be obtained by other methods.

The anthraquinone compounds produced by the process of the invention contain one or two hydroxymethyl groups each of which is in ortho- or para-position to an amino, hydroxy or alkylamino group, and the said compounds optionally contain further substituents.

The anthraquinone compounds containing one or two hydroxymethyl groups produced by the process of the invention are valuable as intermediates in the production of other anthraquinone compounds; thus, for example, they can be converted to the corresponding carboxylic acids by treatment with oxidising agents.

Those anthraquinone compounds produced by the process of the invention which contain auxochromic groups which confer dyestuff properties are valuable in their own right as dyestuffs. In particular the said anthraquinone compounds which are free from water-solubilising groups, that is sulphonic acid groups, are valuable for colouring synthetic textile materials, in particular secondary cellulose acetate, celluose triacetate, polyamide and aromatic polyester textile materials. The said dyestuffs can be applied to textile materials by the methods which are commonly employed in applying dyestuffs to such textile materials, whereby the textile materials are coloured in a wide variety of shades possessing excellent fastness to the tests commonly applied to such textile materials.

The invention is illustrated but not limited by the following examples in which the parts and percentages are by weight.

EXAMPLE 1

A mixture of 11.7 parts of 1:5-dihydroxy-2-(4'-hydroxyphenyl)-4:8-diaminoanthraquinone-6 - sulphonic acid and 350 parts of a 1% aqueous solution of sodium hydroxide is stirred for 30 minutes at 60° C. under an atmosphere of nitrogen. 25 parts of sodium hydroxide are added and the mixture stirred for a further 30 minutes at 60° C. 20 parts of a 40% aqueous solution of formaldehyde and 1.9 parts of zinc dust are then added and the mixture is stirred for a further 3 hours at 60° C. 70 parts of a 36% aqueous solution of hydrochloric acid are then added, and the precipitated dyestuff is filtered off, washed with water and dried.

The product, which consists essentially of 1:5-dihydroxy-2-(4'-hydroxyphenyl)-4:8-diamino - 6 - hydroxymethylanthraquinone, when dispersed in aqueous medium dyes polyester textile materials in deep greenish-blue shades which possess excellent fastness to light and to dry heat treatments.

1:5-dihydroxy-2-(4'-methoxyphenyl)-4:8 - diamino - 6-hydroxymethylanthraquinone is obtained in similar manner using an equivalent amount of 1:5-dihydroxy-2-(4'-methoxyphenyl)-4:8-diaminoanthraquinone - 6 - sulphonic acid.

EXAMPLE 2

In place of the 11.7 parts of the anthraquinone sulphonic acid used in Example 1 there are used 12 parts of 1:5-dihydroxy-2-(4'-hydroxyphenyl) - 4:8 - di(methylamino)-anthraquinone-6-sulphonic acid whereby a dyestuff is obtained which dyes polyester textile materials in greener shades than the dyestuff of Example 1.

EXAMPLE 3

In place of the 1.9 parts of zinc dust used in Examples 1 and 2 there are used 10 parts of sodium hydrosulphite whereby dyestuffs of similar properties are obtained.

EXAMPLE 4

A mixture of 3.3 parts of 1-aminoanthraquinone-2-sulphonic acid, 15 parts of a 40% aqueous solution of sodium hydroxide and 80 parts of water is stirred at 0° to 5° C. under an atmosphere of nitrogen. A solution of 2.3 parts of sodium hydrosulphite in 15 parts of water is added during 10 minutes, followed by 10 parts of a 37% aqueous solution of formaldehyde. The mixture is stirred for 1 hour at 60° C. and the precipitated 1-amino-2-hydroxymethylanthraquinone is then filtered off, washed with water and dried. The yield is 95%.

When dispersed in aqueous medium the product dyes polyester, cellulose acetate or cellulose triacetate textile materials in orange yellow shades of excellent fastness properties.

EXAMPLE 5

In place of the 3.3 parts of 1-aminoanthraquinone-2-sulphonic acid used in Example 4 there are used 3.1 parts of 1-hydroxyanthraquinone-2-sulphonic acid whereby 1-hydroxy-2-hydroxymethylanthraquinone is obtained in a yield of 90%.

When dispersed in aqueous medium the product dyes polyester, cellulose acetate or cellulose triacetate textile materials in bright yellow shades of excellent fastness properties.

1-methylamino-2-hydroxymethylanthraquinone is obtained in a similar manner by starting from an equivalent amount of the sodium or potassium salt of 1-methylaminoanthraquinone-2-sulphonic acid.

EXAMPLE 6

A mixture of 5.73 parts of the sodium salt of 1-amino-4-bromoanthraquinone-2-sulphonic acid and 300 parts of water is stirred at 60° C. under an atmosphere of nitrogen. 6.9 parts of an addition compound of formaldehyde and sodium hydrosulphite and 3.0 parts of a 37% aqueous solution of formaldehyde are added, followed by 22.5 parts of a 40% aqueous solution of sodium hydroxide. The resulting mixture is stirred for 30 minutes at 60° C., and the precipitated 1-amino-2-hydroxymethyl-4-bromoanthraquinone is filtered off, washed with water and dried. The yield is 90%.

An aqueous dispersion of the product dyes polyester, cellulose acetate or cellulose triacetate textile materials in orange shades of excellent fastness properties.

1-amino-2-hydroxymethyl-4-chloroanthraquinone and 1 - amino-2-hydroxymethyl-4-cyanoanthraquinone are obtained in similar manner by using equivalent amounts of the sodium or potassium salts of 1-amino-4-chloroanthraquinone-2-sulphonic acid or 1-amino-4-cyanoanthraquinone-2-sulphonic acid.

EXAMPLE 7

In place of the anthraquinone compound used in Example 6 there are used 5.8 parts of the sodium salt of 1-hydroxy-4-bromoanthraquinone-2-sulphonic acid or 7.0 parts of the sodium salt of 1:4-dihydroxyanthraquinone-2-sulphonic acid whereby 1-hydroxy-2-hydroxymethyl-4-bromoanthraquinone and 1:4-dihydroxy-2-hydroxymethylanthraquinone respectively are obtained.

EXAMPLE 8

A mixture of 3.5 parts of the sodium salt of 1-amino-4-hydroxyanthraquinone-2-sulphonic acid, 3.0 parts of a 40% aqueous solution of sodium hydroxide and 70 parts of water is stirred at 0° to 5° C. under an atmosphere of nitrogen. 12.0 parts of a 40% aqueous solution of sodium hydroxide and a solution of 2.3 parts of sodium hydrosulphite in 15 parts of water are then added, and the mixture stirred for 15 minutes at 0° to 5° C. 10 parts of a 37% aqueous solution of formaldehyde are then added, and the mixture stirred for 2 hours at 40° C. 10 parts of sodium bicarbonate are then added, and the 1-amino-2-hydroxymethyl-4-hydroxyanthraquinone which is precipitated is filtered off, washed with water and dried.

When dispersed in aqueous medium the product dyes polyester, cellulose acetate or cellulose triacetate textile materials in red shades of excellent fastness properties.

EXAMPLE 9

A mixture of 3.8 parts of the sodium salt of 1-amino-4-anilinoanthraquinone-2-sulphonic acid, 20 parts of a 40% aqueous solution of sodium hydroxide and 200 parts of water is stirred at 60° C. under an atmosphere of nitrogen. 0.65 part of zinc dust is added followed by 10 parts of a 37% aqueous solution of formaldehyde. The mixture is stirred for 10 hours at 60° C., and is then cooled to 20° C. The precipitated 1-amino-2-hydroxymethyl-4-anilinoanthraquinone is then filtered off, washed with water and dried. The yield is 80%.

When dispersed in aqueous medium the product dyes polyester textile materials in blue shades which possess excellent fastness properties.

EXAMPLE 10

A solution of 4.16 parts of the sodium salt of 1-amino-4-anilinoanthraquinone-2-sulphonic acid in 200 parts of water is cooled to 0° to 5° C. under an atmosphere of nitrogen. 15 parts of a 40% aqueous solution of sodium hydroxide are added and the mixture is stirred for 15 minutes at 5° C. 4.62 parts of an addition product of formaldehyde and sodium hydrosulphite are added, and the mixture is stirred for 10 minutes at 80° C. The precipitated 1-amino-2-hydroxymethyl - 4 - anilinoanthraquinone is then filtered off, washed with water and dried.

Similar compounds containing the 2-hydroxymethyl group are obtained by replacing the sodium salt of the anthraquinone compound used in the above example by equivalent amounts of the sodium salts of 1-amino-4-(m-toluidino)anthraquinone-2-sulphonic acid,
1-amino-4-(p-carboxyanilino)anthraquinone-2-sulphonic acid,
1-amino-4-(p-chloroanilino)anthraquinone-2-sulphonic acid,
1-amino-4-(2':4':6'-trimethylanilino)anthraquinone-2-sulphonic acid, and aromatic polyester textile materials in red shades having excellent fastness properties.

In place of the 4 parts of the sodium salt of the anthraquinone compound used in Example 13 there are used equivalent amounts of the sodium salts of the anthraquinone sulphonic acids listed in the second column of the following table whereby there are obtained the products listed in the corresponding line of the third column of the table.

| Ex. | Anthraquinone sulphonic acid | Product |
| --- | --- | --- |
| 14 | 1-amino-4-(benzenesulphonamido)anthraquinone-2-sulphonic acid. | 1-amino-2-hydroxymethyl-4-benzenesulphonamidoanthraquinone. |
| 15 | 1-amino-4-(methanesulphonamido)anthraquinone-2-sulphonic acid. | 1-amino-2-hydroxymethyl-4-methanesulphonamidoanthraquinone. |
| 16 | 1-amino-4-acetylaminoanthraquinone-2-sulphonic acid. | 1-amino-2-hydroxymethyl-4-acetylaminoanthraquinone. |
| 17 | 1-amino-4-phenylureidoanthraquinone-2-sulphonic acid. | 1-amino-2-hydroxymethyl-4-phenylureidoanthraquinone. |
| 18 | 1-amino-4-phenylmercaptoanthraquinone-2-sulphonic acid. | 1-amino-2-hydroxymethyl-4-phenylmercaptoanthraquinone. |
| 19 | 1:2:4-trihydroxyanthraquinone-3-sulphonic acid. | 1:2:4-trihydroxy-3-hydroxymethylanthraquinone. |
| 20 | 1:4-dihydroxy-2-chloroanthraquinone-3-sulphonic acid. | 1:4-dihydroxy-2-chloro-3-hydroxymethylanthraquinone. |
| 21 | 1:4-dihydroxy-2-cyanoanthraquinone-3-sulphonic acid. | 1:4-dihydroxy-2-cyano-3-hydroxymethylanthraquinone. |
| 22 | 1:4-dihydroxy-2-ethylanthraquinone-3-sulphonic acid. | 1:4-dihydroxy-2-ethyl-3-hydroxymethylanthraquinone. |
| 23 | 1:4-dihydroxy-2-methoxyanthraquinone-3-sulphonic acid. | 1:4-dihydroxy-2-methoxy-3-hydroxyanthraquinone. |
| 24 | 1-amino-2-methyl-4-hydroxyanthraquinone-3-sulphonic acid. | 1-amino-2-methyl-3-hydroxymethyl-4-hydroxyanthraquinone. |
| 25 | 1-amino-3:4-dihydroxyanthraquinone-2-sulphonic acid. | 1-amino-2-hydroxymethyl-3:4-dihydroxyanthraquinone. |
| 26 | 1:4-dihydroxy-2-phenoxyanthraquinone-3:4'-disulphonic acid. | 1:4-dihydroxy-2-phenoxy-3-hydroxymethylanthraquinone-4'-sulphonic acid. |

1-amino-4-(o-methoxyanilino)anthraquinone-2-sulphonic acid.

EXAMPLE 11

A solution of 4.54 parts of the sodium salt of 1-amino-4 - [p-(β-hydroxyethoxy)anilino]anthraquinone - 2 - sulphonic acid and 20 parts of a 40% aqueous solution of sodium hydroxide in 250 parts of water is stirred at 20° C. under an atmosphere of nitrogen. 0.65 part of zinc dust is added followed by 10 parts of a 37% aqueous solution of formaldehyde and the mixture is stirred for 18 hours at 20° C. The precipitated 1-amino-2-hydroxymethyl-4-[p-(β-hydroxyethoxy)anilino]anthraquinone is filtered off, washed with water and dried. The yield is 80%.

When dispersed in aqueous medium the product dyes polyester textile materials in greenish-blue shades having excellent fastness properties.

EXAMPLE 12

A mixture of 3.4 parts of the disodium salt of 1:8-dihydroxyanthraquinone-2:7-disulphonic acid, 15 parts of a 40% aqueous solution of sodium hydroxide and 80 parts of water is stirred at 0° to 5° C., under an atmosphere of nitrogen. A solution of 4.6 parts of sodium hydrosulphite in 30 parts of water is then added and the mixture is stirred for 15 minutes at 0° to 5° C. 20 parts of a 37% aqueous solution of formaldehyde are added, and the mixture is stirred for 30 minutes at 0° to 5° C., and then for 16 hours at 40° C. The mixture is cooled to 20° C., and the precipitated solid is filtered off. The solid is stirred in water, the mixture is acidified with an aqueous solution of hydrochloric acid, and the precipitated solid is filtered off, washed with water and dried. The product which consists essentially of 1:8-dihydroxy-2:7-di(hydroxymethyl)anthraquinone, is obtained in 90% yield.

EXAMPLE 13

A mixture of 4 parts of the sodium salt of 1-amino-4-(p-toluenesulphonamido)anthraquinone-2-sulphonic acid, 3 parts of a 40% aqueous solution of sodium hydroxide and 60 parts of water is stirred at 45° C. 6 parts of a 37% aqueous solution of formaldehyde are added and the mixture is stirred for 5 minutes. 2 parts of sodium hydrosulphite are added and the mixture stirred for a further 30 minutes at 45° C. The precipitated solid is then filtered off, washed with water and dried.

1-amino-2-hydroxymethyl-4-(p-toluenesulphonamido)-anthraquinone is obtained in a yield of 91%.

When dispersed in aqueous medium the product dyes

EXAMPLE 27

In place of the 4.16 parts of the sodium salt of the anthraquinone compound used in Example 10 there are used 5 parts of the disodium salt of 1-amino-4-(3'-sulphoanilino)-anthraquinono-2-sulphonic acid. The resulting product, which consists of the sodium salt of 1-amino-2-hydroxymethyl-4-(3'-sulphoanilino)anthraquinone, is isolated from the reaction mixture by adding 25 parts of sodium chloride and filtering off the precipitated product.

The sodium salt of 1-amino-2-hydroxymethylanthraquinone-6-sulphonic acid can be obtained in a similar manner by starting from the disodium salt of 1-aminoanthraquinone-2:6-disulphonic acid.

EXAMPLE 28

5 parts of 1-amino-4-benzoylaminoanthraquinone-2-sulphonic acid are dissolved in 20 parts of pyridine at 60° C., and 60 parts of water are then added followed by 4 parts of a 40% aqueous solution of sodium hydroxide and 6 parts of a 37% aqueous solution of formaldehyde. The mixture is stirred for 5 minutes at 60° C., 2 parts of sodium hydrosulphite are added, and stirring continued for a further 30 minutes at 60° C. The precipitated solid is then filtered off, washed with water, and dried.

1-amino-2-hydroxymethyl - 4 - benzoylaminoanthraquinone is thus obtained in a yield of 85%.

1-amino-2-hydroxymethyl - 4 - phenylthioureidoanthraquinone can be obtained in a similar manner starting from 1-amino-4-phenylthioureidoanthraquinone - 2 - sulphonic acid.

I claim:
1. A process for the manufacture of anthraquinone compounds containing from one to two hydroxymethyl groups each of which is in ortho position to a group selected from the class consisting of hydroxy, amino and lower alkylamino groups, and any further substituents on the anthraquinone nucleus are selected from the class consisting of chlorine, bromine, cyano, sulphonic acid, lower alkyl, lower alkoxy, hydroxy, amino, lower alkylamino, anilino, carboxyanilino, β-hydroxyethoxyanilino, sulphoanilino, methylanilino, methoxyanilino, chloroanilino, 2:4:6-trimethylanilino, hydroxyphenyl, lower alkoxyphenyl, phenylmercapto, phenylureido, phenylthioureido, benzoylamino and lower alkyl carbonamido, which comprises treating in alkaline medium with formaldehyde and a reducing agent selected from the class consisting of zinc and sodium hydrosulphite an anthraquinone mono- or di-sulphonic acid wherein each sulphonic acid group is in ortho position to a group selected from the class consisting of hydroxy, amino and lower alkylamino groups, and any further substituents on the anthraquinone nucleus are as defined above.

2. Process as claimed in claim 1 wherein the anthraquinone sulphonic acid is 1-aminoanthraquinone-2-sulphonic acid and any further substituents on the anthraquinone nucleus are selected from the class consisting of chlorine, bromine, cyano, sulphonic acid, lower alkyl, lower alkoxy, hydroxy, amino, lower alkylamino, anilino, carboxyanilino, β-hydroxyethoxyanilino, sulphoanilino, methylanilino, methoxyanilino, chloroanilino, 2:4:6-trimethylanilino, hydroxyphenyl, lower alkoxyphenyl, phenylmercapto, phenylureido, phenylthioureido, benzoylamino and lower alkylcarbonamido.

3. Process as claimed in claim 1 wherein the anthraquinone sulphonic acid is 1-hydroxyanthraquinone-2-sulphonic acid and any further substituents on the anthraquinone nucleus are selected from the class consisting of chlorine, bromine, cyano, sulphonic acid, lower alkyl, lower alkoxy, hydroxy, amino, lower alkylamino, anilino, carboxyanilino, β-hydroxyethoxyanilino, sulphoanilino, methylanilino, methoxyanilino, chloroanilino, 2:4:6-trimethylanilino, hydroxyphenyl, lower alkoxyphenyl, phenylmercapto, phenylureido, phenylthioureido, benzylamino and lower alkyl carbonamido.

References Cited
UNITED STATES PATENTS

| 871,507 | 11/1907 | Homolka et al. | 260—383 |
| 1,903,862 | 4/1933 | Grossman | 260—380 |

LORRAINE A. WEINBERGER, Primary Examiner

E. J. SKELLY, Assistant Examiner

U.S. Cl. X.R.

8—39, 40; 260—372, 373, 374, 375, 376, 377, 378, 380, 381, 383